(12) United States Patent
Furutachi

(10) Patent No.: US 10,348,151 B2
(45) Date of Patent: *Jul. 9, 2019

(54) MOTOR

(71) Applicant: Nidec Corporation, Kyoto (JP)

(72) Inventor: Eiji Furutachi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/019,678

(22) Filed: Jun. 27, 2018

(65) Prior Publication Data

US 2018/0309342 A1 Oct. 25, 2018

Related U.S. Application Data

(63) Continuation of application No. 14/874,596, filed on Oct. 5, 2015, now Pat. No. 10,069,372, which is a
(Continued)

(30) Foreign Application Priority Data

Sep. 17, 2014 (JP) .................................. 2014-188358
Mar. 31, 2015 (JP) .................................. 2015-073138

(51) Int. Cl.
*H02K 1/04* (2006.01)
*H02K 5/16* (2006.01)
(Continued)

(52) U.S. Cl.
CPC ........... *H02K 5/161* (2013.01); *H02K 1/2773* (2013.01); *H02K 1/30* (2013.01); *H02K 5/1735* (2013.01);
(Continued)

(58) Field of Classification Search
CPC ..... H02K 1/2773; H02K 1/30; H02K 11/0068; H02K 5/161; H02K 5/1735
(Continued)

(56) References Cited

U.S. PATENT DOCUMENTS 6,798,091 B2 * 9/2004 Kudou ..................... H02K 5/08
310/43
8,922,083 B2 * 12/2014 Asahi .................. H02K 1/2706
310/156.08
(Continued)

OTHER PUBLICATIONS

Furutachi, "Motor", U.S. Appl. No. 14/874,596, filed Oct. 5, 2015.
(Continued)

*Primary Examiner* — Hanh N Nguyen
(74) *Attorney, Agent, or Firm* — Keating & Bennett, LLP

(57) ABSTRACT

A motor includes a rotary assembly, a stationary assembly, and a bearing mechanism. The rotary assembly includes a resin portion that covers magnets and a rotor core. The rotor core includes a ring-shaped inner core portion, an outer core portion, and connecting portions that radially connect the core elements and the inner core portion. The resin portion includes an upper resin portion and a lower resin portion. The upper resin portion includes gate holes. The lower resin portion is located at a more radially inner side than the outer core elements, and includes a first core support mark exposing a portion of the bottom surface of the rotor core, and a second core support mark located in the outer core portion and exposing a portion of the bottom surface of the rotor core.

9 Claims, 5 Drawing Sheets

Related U.S. Application Data continuation of application No. 14/821,946, filed on Aug. 10, 2015, now Pat. No. 9,954,410.

(51) Int. Cl.
　　*H02K 1/27*　　　(2006.01)
　　*H02K 9/06*　　　(2006.01)
　　*H02K 11/00*　　 (2016.01)
　　*H02K 1/30*　　　(2006.01)
　　*H02K 5/173*　　 (2006.01)
　　*H02K 11/30*　　 (2016.01)

(52) U.S. Cl.
　　CPC ............ *H02K 9/06* (2013.01); *H02K 11/0068* (2013.01); *H02K 11/30* (2016.01)

(58) Field of Classification Search
　　USPC .................................................... 310/30, 43
　　See application file for complete search history.

(56) References Cited

U.S. PATENT DOCUMENTS

| | | | | |
|---|---|---|---|---|
| 9,641,031 | B2* | 5/2017 | Bouarroudj | H02K 1/2773 |
| 2007/0018521 | A1* | 1/2007 | Ishiguro | F04D 29/043 |
| | | | | 310/156.43 |
| 2009/0096308 | A1* | 4/2009 | Staudenmann | H02K 1/2773 |
| | | | | 310/156.08 |

OTHER PUBLICATIONS

Mao et al., "Practical technology for electronic circuit interference", Beijing:National Defense industry Press, 1996, 13 pages.

\* cited by examiner

MOTOR

BACKGROUND OF THE INVENTION

1. Field of the Invention

The present disclosure relates to an electric motor.

2. Description of the Related Art

A spoke type IPM (Interior Permanent Magnet) motor has been known in the past, wherein magnets, of which a cross-sectional surface perpendicular to the center axis of the motor is rectangular, are radially disposed within the rotor core. In the spoke type motor, the surface on the longer side is magnetized, and the circumferentially adjacent magnets are arranged so that identical poles face each other. Also in the spoke type motor, in order to maintain the magnets in the rotor core, insert molding can be performed to provide resin around the magnets.

For example, in the rotor core 23 of the motor 1 disclosed in Japanese Patent Application Publication No. 2010-63285, a magnet 25 is received in a slot 24. The entire magnet 25 is covered by a sealing resin 27. Accordingly, the magnet 25 and the rotor core 23 are integrally combined. The inner circumference of the rotor core 23 is not covered by the sealing resin 27.

The rotor 32 of the motor 1 disclosed in the second preferred embodiment of Japanese Patent Application Publication No. 2014-36457 has a laminated core 51, a plurality of magnets 52 and a resin portion 53. The laminated core 51, both axial end surfaces of the plurality of magnets 52 and radially outer surfaces of the magnets 52 are covered with the resin portion 53. The laminated core 51 has an inner core portion 61, a plurality of outer core portions 62 and a plurality of connecting portions 63. The plurality of connecting portions 63 connect the inner core portion 61 and the plurality of outer core portions 62. The top surface of an upper resin portion 531 of the resin portion 53 has a gate hole 91. The gate hole 91 is formed on the upper portion of the outer core portion 62. A lower resin portion 532 has a plurality of second positioning holes 94 disposed in an area which axially overlaps with an outer edge portion of the plurality of outer core portions 62. The resin portion 53 does not exist on the inner circumferential surface of the inner core portion.

In order to reduce the size of a spoke type IPM motor, it is important to direct a magnetic flux from the magnetic surface of the magnet and deliver it efficiently to the stator. For this reason, the circumferential width of the connecting portion between the outer core portion and the inner core portion is designed as narrowly as possible, so that the magnetic flux can be prevented from flowing into a radially inner side. However, when the width of the connecting portion becomes narrow, the rigidity of the rotor core is lessened, whereby the rotor core can be deformed by the pressure when performing insert molding.

Also, in a conventional rotary assembly, the inner circumferential surface of the rotor core and the bottom surface of the inner circumferential portion are not covered with resin as they are the supported portions when performing insert molding. For this reason, deformation of the rotor core can be easily prevented. A bearing or a shaft is retained directly by the inner circumferential surface of the rotor core. In such a case, high precision is required for the inner diameter of each magnetic steel plate, and it becomes necessary to frequently polish the mold for puncturing the magnetic plate, and the life span of the mold is shortened. When a bearing is retained by the upper side and the lower side of the rotor core, the size of the motor is axially enlarged.

SUMMARY OF THE INVENTION

Preferred embodiments of the present invention prevent deformation of a connecting portion of a rotor core in a spoke type IPM motor.

A motor according to a first preferred embodiment of the present invention includes a rotary assembly which rotates on a vertical center axis; a stationary assembly which is disposed around the rotary assembly; a bearing mechanism which rotatably supports the rotary assembly relative to the stationary assembly; and a shaft which is rotatably supported relatively with respect to the bearing mechanism. The rotary assembly includes: a plurality of magnets arranged in a circumferential direction; a rotor core provided with a plurality of magnetic steel plates laminated in an axial direction; and a resin portion covering the plurality of magnets and the rotor core. When seen from above, a radial length of each of the plurality of magnets is longer than its circumferential length. The rotor core includes a ring-shaped inner core portion disposed on a radially inner side of the plurality magnets; an outer core portion disposed on a radially outer side of the inner core portion; and a plurality of connecting portions connecting the outer core portion and the inner core portion in a radial direction. The outer core portion includes a plurality of outer core elements which are connected to the inner core portion through the plurality of connecting portions. The resin portion includes: an upper resin portion covering at least a portion of the top surface of a rotor core and at least a portion of a top surface of each magnet; and a lower resin portion covers at least a portion of a bottom surface of the rotor core and at least a portion of a bottom surface of each magnet. The resin portion further includes a ring-shaped inner circumferential resin portion which covers the inner circumferential surface of the rotor core. The upper resin portion and the lower resin portion are continuously connected with the inner circumferential resin portion. The bearing mechanism or the shaft is retained by the inner circumferential resin portion. The stationary assembly is provided with a shaft. The bearing mechanism is provided with an upper bearing and a lower bearing. The resin portion further includes a ring-shaped inner circumferential resin portion which covers at least a portion of the inner circumferential surface of the rotor core. The inner circumferential resin portion is continuously connected to at least one of the upper resin portion and the lower resin portion. One of the upper bearing and the lower bearing is retained in the inner circumferential resin portion. The resin portion has a cylindrical shape having its center on the center axis, and further includes a cylindrical resin portion which protrudes away from the rotor core. One of the upper bearing and the lower bearing is retained in the cylindrical resin portion.

According to the preferred embodiments of the present invention, deformation of the connecting portion between the inner core portion and the outer core portion can be prevented from occurring when performing insert molding.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
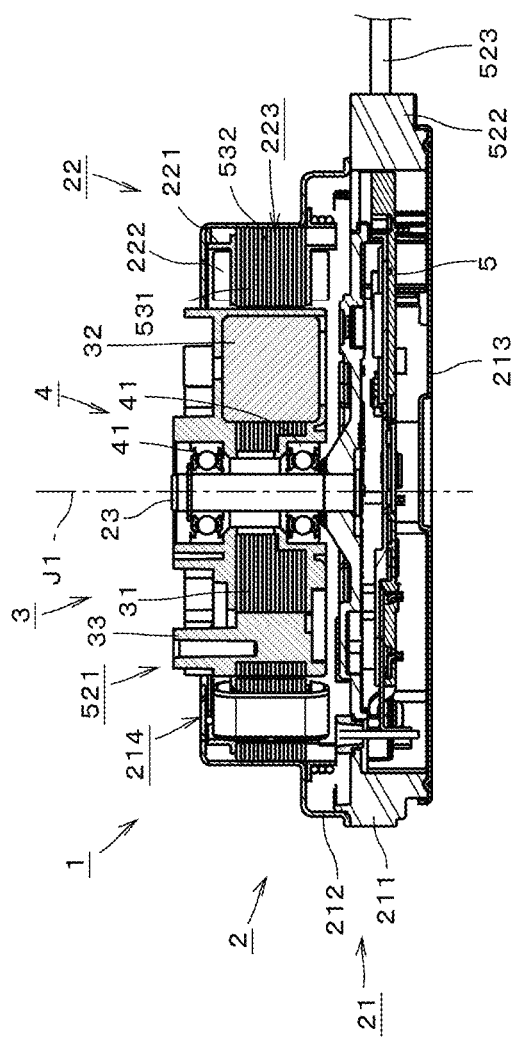
FIG. 2 is a vertical sectional view of the motor.

Herein, in the direction of the center axis J1 of the motor 1, the upper side shown in FIG. 2 is simply referred to as "upper side", and the lower side thereof is simply referred to as "lower side". Also, the upper and lower directions do not necessarily refer to the positional relations or directions when the motor is actually assembled and installed to any equipment. Further, a direction parallel to the center axis J1 is simply referred to as "axial direction", the radial direction having its center on the center axis J1 is simply referred to as "radial direction", and the circumferential direction having its center on the center axis J1 is simply referred to as "circumferential direction".

Figure 1:
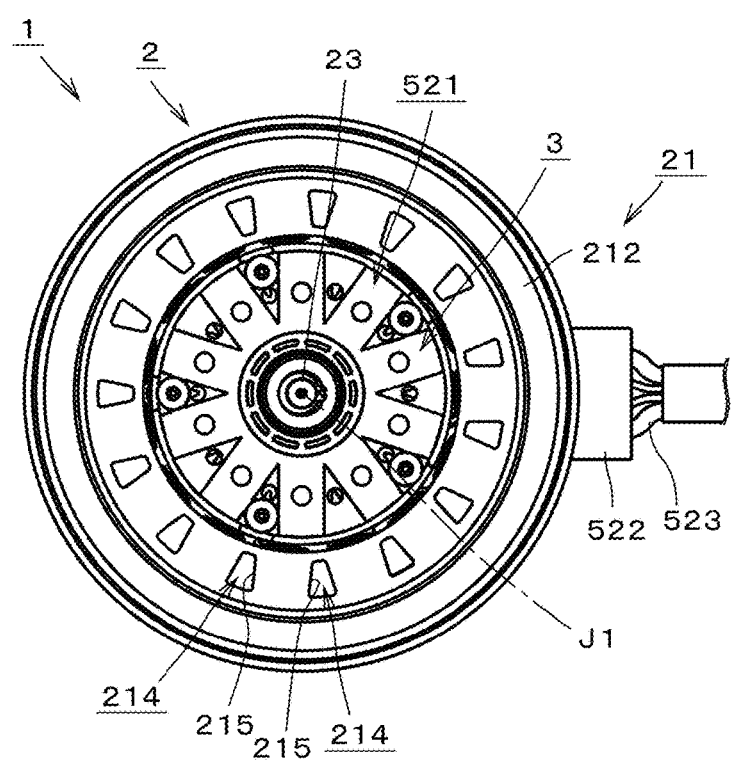
FIG. 1 is a top view of a motor according to the first preferred embodiment.

FIG. 1 is a top view which illustrates a motor 1 according to an exemplary first preferred embodiment of the present disclosure. FIG. 2 is a vertical sectional view of the motor 1. A parallel diagonal line is omitted from the section details. Motor 1 is an inner rotor type brushless motor. The motor 1 includes a stationary assembly 2, a rotary assembly 3, a bearing mechanism 4 and a circuit board 5. The bearing mechanism 4 rotatably supports the rotary assembly 3 with respect to the stationary assembly 2, having its center on the center axis J1 of the motor 1. An impeller cup of an impeller can be attached to the rotary assembly 3. The motor 1 is used in, for example, a fan for cooling the coolant of a vehicle.

The stationary assembly 2 includes a housing 21, a stator 22 and a shaft 23. The stator 22 is disposed around the rotary assembly 3. The stationary assembly 2 is disposed around the rotary assembly 3. The housing 21 includes a base member 211 and a cover 212. The base member 211 has a substantially plate shape which is perpendicular to the center axis J1. The shaft 23 protrudes upwardly, with the lower end fixed to the base member 211. The shaft 23 is disposed to have its center on the center axis J1. The cover 212 has a substantially cylindrical shape, and can be attached on the base member 211. An opening 521 is provided at the center of the cover 212. The opening 521 exposes the rotary assembly 3.

The stator 22 includes a stator core 223, an insulator 221 and a coil 222. The stator core 223 includes a plurality of teeth 531 and a core back 532. The core back 532 has a ring shape having its center on the center axis J1. Each of the teeth 531 extends radially inward from the core back 532 to the rotary assembly 3. In the stator core 223, electromagnetic steel plates are laminated. The teeth 531 are covered by the insulator 221. The coil 222 is installed to surround the insulator 221.

The circuit board 5 is attached to a bottom surface of the center portion of the base member 211. The circuit board 5 controls the power supply provided to the stationary assembly 2. Accordingly, the rotation speed of the rotary assembly 3 can be controlled. A lid member 213 is attached to a bottom portion of the base member 211. The lid member 213 covers a bottom surface of the circuit board 5. The base member 211 includes a protrusion 522 which protrudes in a lateral direction. A plurality of wires 523 connected to the circuit board 5 are drawn out from the protrusion 522.

The bearing mechanism 4 has two bearings 41. In this preferred embodiment, the bearing 41 is a ball bearing. The bearing 41 may be of a different structure. The two bearings 41 are provided between the shaft 23 and the rotary assembly 3.

The rotary assembly 3 includes a rotor core 31, a plurality of magnets 32 and a resin portion 33. The magnet 32 is a permanent magnet. The rotor core 31 is disposed at an inner side of the stator 22 in the radial direction. The outer circumferential surface of the rotor core 31 is adjacent to the inner circumferential surface of the stator 22.

Figure 3:
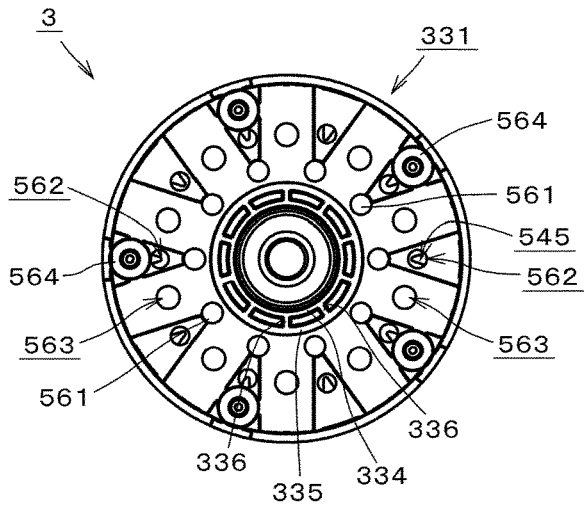
FIG. 3 is a top view of a rotary assembly.
Figure 4:
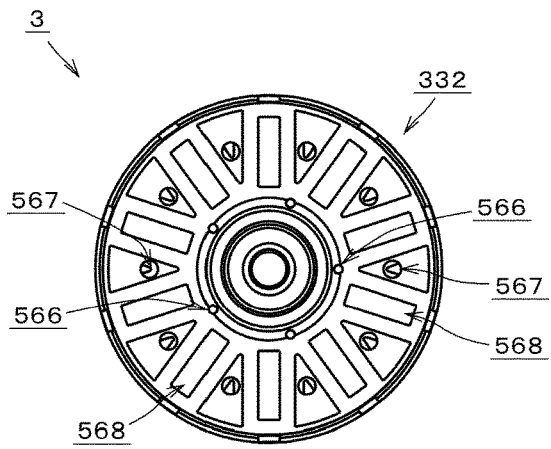
FIG. 4 is a bottom view of the rotary assembly.
Figure 5:
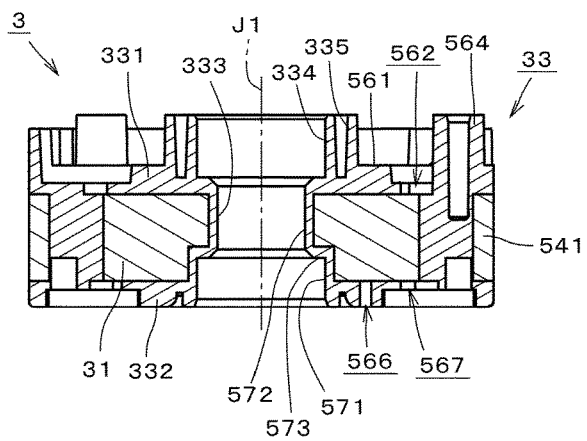
FIG. 5 is a vertical sectional view of the rotary assembly.
Figure 6:
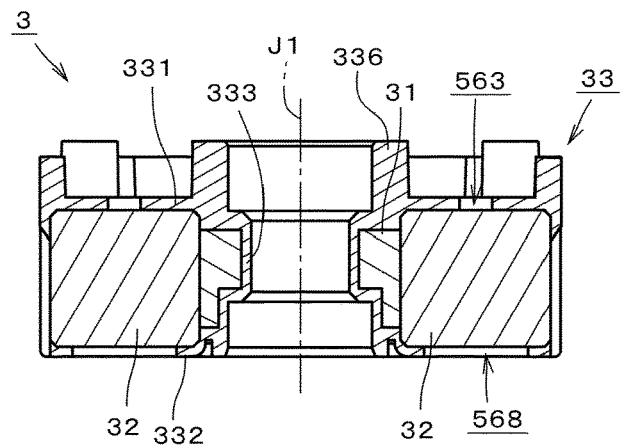
FIG. 6 is a vertical sectional view of the rotary assembly.
Figure 7:
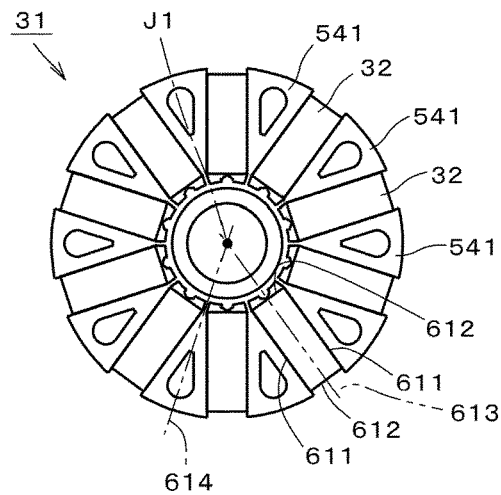
FIG. 7 is a bottom view of the rotor core and the magnets.
Figure 8:
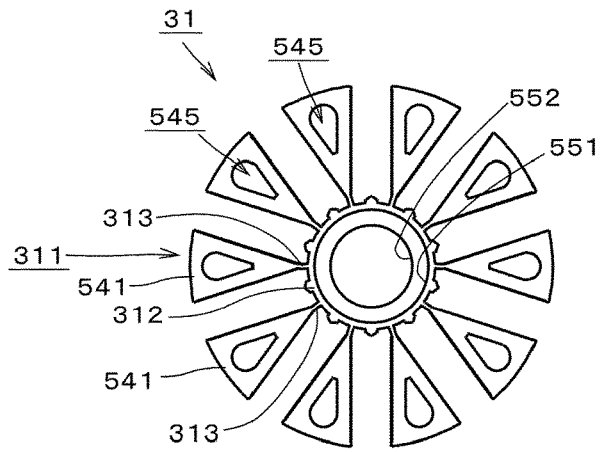
FIG. 8 is a bottom view of the rotor core.
Figure 9:
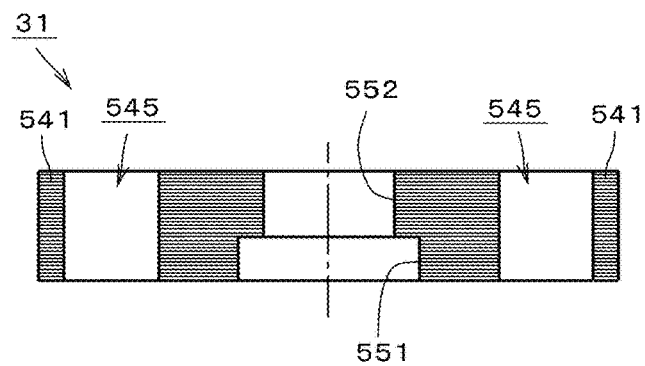
FIG. 9 is a vertical sectional view of the rotor core.

FIG. 3 is a top view of the rotary assembly 3. FIG. 4 is a bottom view of the rotary assembly 3. FIG. 5 is a vertical sectional view of the rotary assembly 3. FIG. 6 is a vertical sectional view of the rotary assembly 3, viewed from a different position than FIG. 5. FIG. 7 is a bottom view of the rotor core 31 and the magnet 32. FIG. 8 is a bottom view of the rotor core 31. FIG. 9 is a vertical sectional view of the rotor core 31. In the rotor core 31, electromagnetic steel plates are axially laminated.

As shown in FIG. 8, the rotor core 31 includes an outer core portion 311, an inner core portion 312 and a plurality of connecting portions 313. The inner core portion 312 has a ring shape. The outer core portion 311 includes a plurality of outer core elements 541. The plurality of outer core elements 541 are arranged in the circumferential direction. Each outer core element 541 has a substantially fan-like shape. The outer core portion 311 is located at a radially outer side of the inner core portion 312. Each connecting portion 313 connects one outer core element 541 and the inner core portion 312 in the radial direction. The connecting portion 313 extends in the radial direction, and connects the circumferential center of the radially inner portion of the outer core element 541 with the outer circumferential surface of the inner core portion 312. The outer core element 541, the inner core portion 312 and the connecting portion 313 form a continuously connected member.

FIG. 9 is a vertical sectional view of the rotor core 31 cut at the circumferential center of the outer core element 541. As shown in FIG. 8 and FIG. 9, the outer core element 541 has a through hole 545 which penetrates in the axial direction. The inner circumferential portion of the rotor core 31, that is, the inner circumferential portion of the inner core portion 312, includes a core large-diameter portion 551 and a core small-diameter portion 552. The core large-diameter portion 551 is disposed at an axially lower side of the core small-diameter portion 552. The inner diameter of the core large-diameter portion 551 is bigger than the inner diameter of the core small-diameter portion 552.

As shown in FIG. 7, magnets 32 are disposed between the outer core elements 541. Each outer core element 541 is a portion which is disposed between any two of the plurality of magnets 32 in the outer core portion 311. The magnets 32 are arranged in the circumferential direction, with identical intervals. The inner core portion 312 is disposed at a radially inner side of the plurality of magnets 32. The rotor core 31 holds the magnets 32. In the cross section perpendicular to the center axis J1, each magnet 32 has a pair of long sides 611 and a pair of short sides 612. That is, in the top view, the radial length of each of the plurality of magnets is longer than the circumferential length thereof. A center-line 613 between the pair of long sides 611 passes through the center axis J1. That is, the center-lines 613 of every magnet 32 intersect on the center axis J1. The motor 1 is a spoke type IPM motor.

The pair of long sides 611 is magnetized into opposite poles from each other. In an adjacent pair of magnets 32, identical poles face each other in the circumferential direction. Accordingly, some of the magnetic field lines are directed outside the rotor core 31 via the outer circumferential surface of the outer core element 541 from the long sides 611 facing each other, entered into the rotor core 31 through the outer circumferential surfaces of the outer core elements 541 that are adjacent at both sides, and guided to the other pole. The outer core element 541 functions as a magnetic pole with respect to the stator 22.

Figure 10:
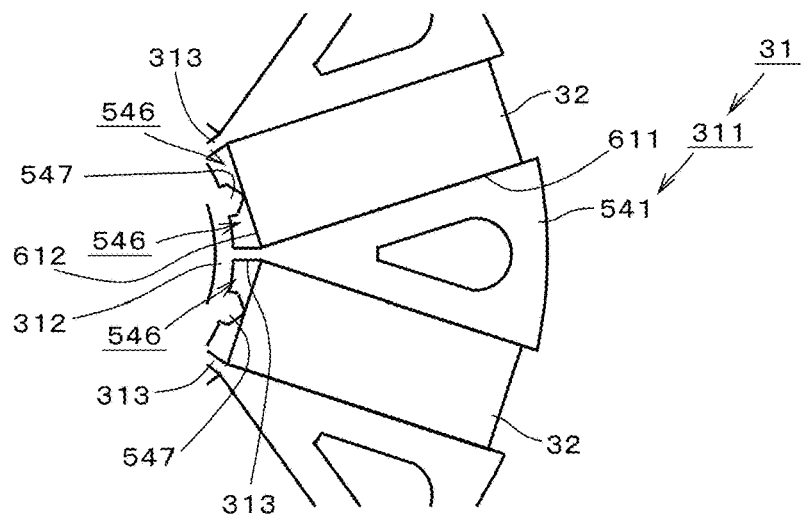
FIG. 10 is an enlarged top view of the rotor core and the magnets.

FIG. 10 is an enlarged top view of the rotor core 31 and the magnet 32. As previously described, the outer core portion 311 and the inner core portion 312 are connected by a plurality of connecting portions 313. A flux barrier 546 is provided between the outer core element 541 and the inner core portion 312, and on both sides of the connecting portion 313 in the circumferential direction. The flux barrier 546 is a space where neither the rotor core 31 nor the magnet 32 exists. In other words, the outer core portion 311 is provided at a radially outer side of the flux barrier 546. The inner core portion 312 is provided at a radially inner side of the flux barrier 546. The connecting portion 313 is provided between a pair of adjacent magnets, and is disposed between a pair of flux barriers 546. In the present preferred embodiment, a portion of the resin portion 33 exists within the flux barrier 546. Accordingly, the resin portion 33 covers around the connecting portion 313 and prevents the inflow of magnetic flux, hence the strength of the connecting portion 313 is improved and deformation can be thereby prevented.

The resin does not necessarily exist in the flux barrier 546, that is, in the rotor core 31. It is sufficient if the flux barrier 546 is provided to an area where magnetic resistance is bigger than other portions. For example, in the flux barrier 546, air or other matter may exist.

The inner core portion 312 includes a plurality of protrusions 547 which protrude outwardly in the radial direction from the outer circumferential surface. Each protrusion 547 is disposed between two connecting portions 313. The short side 612 of the magnet 32 is in contact with the protrusion 547 in the radial direction. The long side 611 of the magnet 32 is in contact with the outer core element 541 in the circumferential direction. Each flux barrier 546 is defined by an outer circumferential surface of an inner core portion 312, connecting portions 313, a short side 612 of a magnet, and a protrusion 547. The short side 612 is in contact with two flux barriers 546.

By providing the flux barrier 546, the magnetic flux can be prevented from heading towards a radially inner side, and thereby the magnetic flux can be efficiently guided towards the outer core element 541 from the magnet 32. As a result, a large amount of magnetic flux can be derived towards the radially outer side of the outer core element 541, and thereby the output of the motor 1 can be enhanced without changing its size. In other words, it is possible to prevent reduction of the output and achieve miniaturization of the motor 1.

In order to prevent the inflow of magnetic flux into the inner core portion 312, it is preferable that the connecting portion 313 is thin. With such feature, the connecting portion 313 can easily be magnetically saturated, and block out the magnetic flux. Preferably, the radial length of the connecting portion 313 is longer than the circumferential width thereof.

FIG. 5 is a vertical sectional view of the rotary assembly 3 which includes the center axis J1, and which is defined by a surface that passes through the circumferential center of the outer core element 541. FIG. 6 is a vertical section view of the rotary assembly 3 which includes the center axis J1, and which is defined by a surface that passes through the circumferential center of the magnet 32. The plurality of magnets 32 and the rotor core 31 are covered by the resin portion 33. The resin portion 33 includes an upper resin portion 331, a lower resin portion 332 and an inner circumferential resin portion 333.

The upper resin portion 331 covers at least a portion of the top surface of the rotor core 31 and at least a portion of the top surface of each magnet 32. The lower resin portion 332 covers at least a portion of the bottom surface of the rotor core 31 and at least a portion of the bottom surface of each magnet 32. With such feature, the rotor core 31 and the magnet 32 become integrated by the resin portion 33 in the axial direction. Preferably, the resin portion 33 covers at least a portion of the radially outer side surface of the magnet 32, and holds the magnet 32 in the radial direction. Of course, the retainment of the magnet 32 with respect to the rotor core 31 can also be accomplished with different structures.

The inner circumferential resin portion 333 covers the inner circumferential surface of the rotor core 31, and has a ring shape. It is not necessarily required to strictly define the boundary among upper resin portion 331, the lower resin portion 332 and the inner circumferential resin portion 333. The upper resin 331 and the lower resin portion 332 are connected with the inner circumferential resin portion 333, and form a continuously connected member. The upper resin portion 331, the lower resin portion 332 and the inner circumferential resin portion 333 may not be connected.

As shown in FIG. 3, FIG. 5 and FIG. 6, the upper resin portion 331 includes a plurality of gate holes 561, a plurality of upper core support marks 562, a plurality of upper magnet support marks 563 and an impeller attachment portion 564. The position of the gate hole 561 corresponds to the position of the gate from insert molding. The circumferential position of the gate holes 561 is identical to the circumferential position of the outer core elements 541. The number of gate holes 561 is identical to the number of outer core elements 541. The gate hole 561 is formed on a radially inner side area of the outer core element 541.

The upper core support mark 562 is a mark of a pin which supports the outer core element 541 from the upper side during insert molding. The circumferential position of the upper core support marks 562 is identical to the circumferential position of the outer core elements 541. The number of upper core support marks 562 is identical to the number of outer core elements 541. The upper core support mark 562 overlaps with the radially inner side area of the through hole 545 of the outer core element 541. The inside of the through hole 545 may be filled with resin or not filled with resin. In the upper core support mark 562, a portion of the top surface of the rotor core 31 is exposed.

The upper magnet support mark 563 is a mark of a pin which supports the magnet 32 from the upper side while performing insert molding. The circumferential position of the upper magnet support marks 563 is identical to the circumferential position of the magnets 32. The number of upper magnet support marks 563 is identical to the number of magnets 32. The radial position of the upper magnet support mark 563 is a substantial center of the magnet 32 in the radial direction. In the upper magnet support mark 563, a portion of the top surface of the magnet 32 is exposed.

The impeller attachment portion 564 is an area where an impeller cup is attached to the rotary assembly 3. The circumferential position of the impeller attachment portions 564 is identical to the circumferential position of the outer core elements 541. In the present preferred embodiment, the number of impeller attachment portions 564 is about half the number of outer core elements 541. The circumferential position of the plurality of impeller attachment portions 564 is identical to the every other circumferential position of the outer core elements 541. The impeller attachment portion 564 overlaps with the radially outer side area of the outer core element 541.

As shown in FIG. 4, FIG. 5 and FIG. 6, the lower resin portion 332 includes a plurality of first lower core support marks 566, a plurality of second lower core support marks 567 and a plurality of lower magnet support marks 568. The first lower core support mark 566 is a mark of a pin which supports at least one direction of the connecting portion 313 and the inner core portion 312 from the lower side during insert molding. The circumferential position of the first lower core support marks 566 is identical to the circumferential position of the outer core elements 541, that is, that of the connecting portion 313. The number of first lower core support marks 566 is about half the number of outer core elements 541. The circumferential position of the plurality of first lower core support marks 566 is identical to the every other circumferential position of the outer core elements 541.

In the first lower core support mark 566, a portion of the bottom surface of the rotor core 31 is exposed. The pin of the mold corresponding to the first lower core support mark 566 may support only the inner core portion 312, or only the connecting portion 313. That is, the first lower core support mark 566 is disposed at a radially inner side than the outer core element 541. In the present preferred embodiment, the pin supports at least a portion of the inner core portion 312 and at least a portion of the connecting portion 313. Accordingly, from the first lower core support mark 566, a portion of the inner core portion 312 and a portion of the connecting portion 313 are exposed.

Including the flux barrier 546, resin exists around the connecting portion 313. However, it does not exist in the first lower core support mark 566. For this reason, whether or not the connecting portion 313 is deformed during insert molding can be easily visually observed through the first lower core support mark 566. Accordingly, before electric current is actually provided to the motor 1, any problem caused by the deformation of the rotor core 31 can be found.

Except for that the second lower core support mark 567 is provided at the lower resin portion 332, its number, the circumferential and radial positions are identical to those of the upper core support mark 562. In each second lower core support mark 567, a portion of the bottom surface of the rotor core 31 in the outer core portion 311 is exposed.

The lower magnet support mark 568 is a mark of a pin which supports the magnet 32 from the lower side while insert molding. The circumferential position of the lower magnet support marks 568 is identical to the circumferential position of the magnets 32. The number of lower magnet support marks 568 is identical to the number of magnets 32. The lower magnet support mark 568 has a rectangular shape that is smaller than the magnet 32. In the lower magnet support mark 568, a portion of the bottom surface of the magnet 32 is exposed.

By providing the first lower core support mark 566 at a more radially inner side than the outer core element 541, that is, by supporting the rotor core 31 at a more radially inner side than the outer core element 541 within the mold, the deformation of a rigid and small connecting portion 313 can be prevented, even when the resin is injected into the mold downwardly from an upper side. As a result, irregularity in the quality of the motor 1 can be reduced. The "prevention of deformation" of the connecting portion 313 in the present preferred embodiment includes "reduction of deformation". The support for the rotor 31 in the first lower core support mark 566 is suitable when the radius of the rotor core 31 is bigger than the axial thickness of the rotor 31 and when the connecting portion 313 is easy to deform, as shown in FIG. 9.

In this preferred embodiment, each of the plurality of first lower core support marks 566 overlaps with at least a portion of any one of the connecting portions 313. In this case, comparing with the case in which the first lower core support mark 566 overlaps with the inner core portion 312, the first lower core support mark 566 is positioned at a radially outer side. As a result, the profile accuracy of the inner circumferential surface of the lower resin portion 332 can be enhanced. The enhancement of the profile accuracy of the inner circumferential surface of the lower resin portion 332 is preferable when the bearing 41 is retained at the inner circumferential surface, as described in detail below.

The plurality of gate holes 561 are provided in the radial direction, and disposed between the plurality of first lower core support mark 566 and the plurality of second lower core support mark 567. Accordingly, when performing insert molding, it is possible to stably support the rotor core 31, which receives pressure from the flowing resin, by the first lower core support mark 566 and the second lower core support mark 567.

As described above, the circumferential center position of each gate hole 561 and each first lower core support mark 566 is identical to the circumferential center position of the outer core element 541. In other words, as illustrated in FIG. 7, the circumferential center position of each gate hole 561 and each first lower core support mark 566 overlaps in the axial direction with the center-line 614 which heads towards the radial direction via the circumferential center position of any one of the connecting portions 313. Accordingly, also when performing insert molding, the rotor core 31 can be stably supported. The support of the rotor core 31 can also be stabilized by disposing the second lower core support mark 567 on the center-line 614. However, if the plurality of second lower core support marks 567 are correspondingly provided to a single outer core element 541, it is unnecessary for the second lower core support mark 567 to be disposed on the center-line 614.

As shown in FIG. 5, the resin portion 33 has a cylindrical shape having its center on the center axis J1, and includes another cylindrically-shaped resin portion 334 which protrudes upwardly, away from the rotor core 31. The resin portion 33 includes another cylindrically-shaped resin portion 335 which covers the outer circumference of the cylindrically-shaped resin portion 334. Hereinafter, the cylindrically-shaped resin portion 334 is referred to as "inner cylindrical resin portion", and the cylindrically-shaped resin portion 335 as "outer cylindrical resin portion". As shown in FIG. 3 and FIG. 6, the resin portion 33 further includes a plurality of rib portions 336 which connect the inner cylindrical resin portion 334 and the outer cylindrical resin portion 335 in the radial direction.

As shown in FIG. 2, the inner cylindrical resin portion 334 functions as a bearing support portion for holding the upper bearing 41 in the inner circumferential surface. The bearing 41 is accurately retained in the inner cylindrical resin portion 334 at a press-fit state. By providing the inner cylindrical resin portion 334, the bearing 41 can be retained with a higher positional accuracy by the resin, even if the rotor core 31 is thin. By providing the outer cylindrical resin portion 335 and the rib portion 336, the rigidity of the inner circumferential surface of the inner cylindrical resin portion 334 can be enhanced, and the retainment of the bearing 41 of the upper side can also be improved as well. Especially, with the space in between the inner cylindrical resin portion 334 and the outer cylindrical resin portion 335 where the rib portion 336 is provided, a decrease in the inner diameter accuracy of the inner cylindrical resin portion 334 caused by the contraction of the resin can be prevented.

The impeller attachment portion 564 is provided around the inner cylindrical resin portion 334 and the outer cylindrical resin portion 335. At the center of the impeller cup, a hole portion or a concave portion is provided for inserting the cylindrical resin portions. Accordingly, the height of the fan can be suppressed.

As described with reference to FIG. 9, the inner circumferential portion of the rotor core 31 includes a core large-diameter portion 551 and a core small-diameter portion 552. As shown in FIG. 5, the inner circumferential resin portion 333 includes a resin large-diameter portion 571, a resin small-diameter portion and a resin stepped portion 573. The resin large-diameter portion 571 covers the inner circumferential surface of the core large-diameter portion 551. The resin small-diameter portion 572 covers the inner circumferential surface of the core small-diameter portion 552. The resin large-diameter portion 571 and the resin small-diameter portion 572 respectively have a substantially cylindrical shape, having the center on the center axis J1. The resin stepped portion 573 has a ring shape which expands out perpendicularly to the center axis J1, and connects the upper end of the resin large-diameter portion 571 and the lower end of the small-diameter portion 572 in the radial direction.

The inner cylindrical resin portion 334 is disposed on the upper side of the resin small-diameter portion 572. The inner diameter of the resin small-diameter portion 572 is smaller than the inner diameter of the inner cylindrical resin portion 334, and a stepped portion is provided between the resin small-diameter portion 572 and the inner cylindrical resin portion 334. As shown in FIG. 2, the lower bearing 41 is retained at the inner circumferential surface of the resin large-diameter portion 571. The upper end of the bearing 41 is in contact with the bottom surface of the resin stepped portion 573. Accordingly, the axial position of the bearing 41 can be easily determined. The bearing 41 is accurately retained in the resin large-diameter portion 571 in a direction perpendicular to the center axis J1 at a press-fit state. Since the inner circumference of the rotor core 31 is covered by resin, burrs of the laminated steel plates are prevented from falling apart. As a result, increase of noise or shortening of life span caused by, for example, the fallen burr entering the bearing 41, can be prevented.

Also by disposing the upper end of the lower bearing 41 in an upper position from the bottom surface of the rotor core 31, the bearing 41 is retained at the inner side of the rotor core 31, and the height of the motor 1 can be suppressed lower and weight lightening of the motor can be realized. In case the bearing 41 is directly held at the rotor core 31, in order to maintain a highly precise inner diameter of the rotor core 31, it becomes necessary to increase the number of grinding the mold which drills holes in the steel plate. By retaining the bearing at the resin portion 33, in the direction perpendicular to the center axis J1, the high precision of resin molding can be acquired, the bearing can be retained with high precision, and since the molding temperature of the resin is low, less abrasion is occurred on the mold, and therefore grinding of the mold becomes unnecessary in the first place, and it is thereby possible to extend the life of the mold.

As shown in FIG. 2, the circuit board 5 is disposed perpendicularly to the center axis J1. The lower bearing 41 is retained at the inner circumferential resin portion 333, and also, the lower end of the shaft 23, that is, the end portion of the lower bearing 41 side of the shaft 23 is supported by the stationary assembly 2. Accordingly, it becomes possible to suppress the height of the motor 1, and dispose the lower end of the shaft 23 and the circuit board 5 in the axial direction. As a result, it becomes unnecessary to provide a through hole on the circuit board 5 for the penetration of the shaft 23, and the circuit board 5 can be made smaller in the radial direction. Also, miniaturization, weight lightening and low manufacturing cost of the motor 1 can be acquired.

As shown in FIG. 1 and FIG. 2, the upward portion of the stator 22 is covered by the cover 212. The cover 212 includes a plurality of openings 214 arranged in the circumferential direction above the stator 22. This opening 214 may be a through hole, and may also be a notch cut from a radially inner side towards the outer side. The heat generated at the stator 22 can be released to the outside by the air flow or radiated through the opening 214. Meanwhile, the cover 212 blocks the radiation of electromagnetic waves generated from the coil end of the stator 22, and also has a function of preventing EMI (electro-magnetic interference).

For the function of preventing EMI, the opening 214 is preferably small. However, when the opening 214 is made small, heat radiation is deteriorated. Thus, in motor 1, the circumferential center of the opening 214 is disposed between a coil 222 and another coil 222, so that EMI can be reduced and heat radiation can be secured. Such reduction of EMI is especially suitable for a motor for vehicles. Also, by disposing the opening 214 between coils 222, air flow generated by the rotation of the rotary assembly 3 can be easily occurred at the position of the opening 214, and heat radiation can be obtained even with a small opening 214.

In the top view, it is preferable for the coil 222 to be almost completely hidden by the cover 212, and it is also preferable to form a larger opening 214. For this reason, it is preferable for the opening 214 to have a circumferential width gradually increasing towards a radially outward side. In an example shown in FIG. 1, in an area between an opening 214 and another opening 214 adjacent to each other, two sides 215 in contact with both of the openings 214 are parallel with each other and head towards substantially in the radial direction. Accordingly, it is possible to easily prevent foreign matter from becoming in contact with the coil 222.

Figure 11:
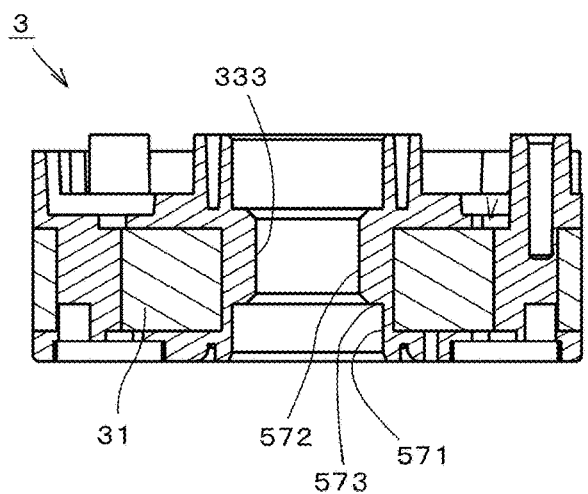
FIG. 11 is a vertical sectional view of a rotary assembly according to another preferred embodiment.

FIG. 11 illustrates another example of the rotary assembly 3, and corresponds to FIG. 5. The diameter of the inner circumferential portion of the rotor core 31 is constant. Meanwhile, the inner circumferential resin portion 333 comprises, as shown in FIG. 5, a resin large-diameter portion 571, a resin small-diameter portion 572 and a resin stepped portion 573. The resin large-diameter portion 571 covers the lower portion of the inner circumferential surface of the rotor core 31, and the resin small-diameter portion 572 covers the middle and upper portions of the inner circumferential surface of the rotor core 31. The inner diameter of the resin small-diameter portion 572 is smaller than the inner diameter of the resin large-diameter portion 571. The resin stepped portion 573 connects the resin large-diameter portion 571 and the resin small-diameter portion 572. The lower bearing 41 is retained at the resin large-diameter portion 571. The upper end of the bearing 41 is in contact with the bottom surface of the resin stepped portion 573.

In the axial direction, since the inner diameter of the rotor core 31 is constant, the manufacturing costs of the rotor core 31 can be reduced. Meanwhile, by installing the resin large-diameter portion 571, the resin small-diameter portion 572 and the resin stepped portion 573, the position of the lower bearing 41 can be accurately arranged.

A variety of modifications can be made to the motor 1.

In the housing 21, the base member 211 and the cover 212 can be a single member. On the contrary, the housing 21 can be a combination of three or more elements. In the rotor core 31, it is unnecessary for the width of the connecting portion 313 to be constant. The connecting portion 313 is disposed at a more radially inner side than the magnet 32, and has a width which is equal to or smaller than the minimum circumferential width of the outer core element 541. The length of the connecting portion 313 can be shorter. In the top view, the connecting portion 313 is a constricted portion between the outer core element 541 and the inner core portion 312. It is unnecessary for the magnet 32 have a rectangular shape when seen in the top view.

The number of poles of the rotary assembly 3 and the stationary assembly 2 can be variously modified. A variety of methods can be employed for fixing the magnet 32 to the rotor 31. For example, an adhesive can be jointly used, and a portion of the laminated steel plate can fix the position of the magnet 32.

The gate hole 561 and the first lower core support mark 566 can be partially overlapped. In such case, the connecting portion 313 receives a strong force from the resin when performing insert molding. However, deformation of the connecting portion 313 can be prevented from occurring at the first lower core support mark 566.

The shape of each support mark formed at the resin portion 33 is not limited to a hole shape. For example, it can be a notch-like shape which is provided on the edge, such as the outer circumference or the inner circumference of the rotor core 31. It is unnecessary for the inner circumferential resin portion 333 to cover the entire inner circumferential surface of the rotor core 31. It is sufficient if at least a portion of the inner circumferential surface is covered. The resin portion 333 can be connected to only one of the upper resin portion 331 and the lower resin portion 332.

The upper bearing 41 and the lower bearing 41 can be alternately exchanged. That is, the inner cylindrical resin portion 334 may be connected to the lower resin portion 332, and thereby the resin large-diameter portion 571 can be connected to the upper resin portion 331. This structure is substantially identical to the structure illustrated in FIG. 2, the only difference is that the upper bearing 41 and the lower bearing 41 are not alternately exchanged, and the upper resin portion 331 and the lower resin portion 332 are alternately exchanged. As long as the gate hole 561 and the first lower core support mark 566 exist on an opposite side from the rotor core 31, the position or the shape of a support mark can be variously modified.

In the motor 1, the shaft 23 is fixed to the stationary assembly 2. However, a rotating shaft structure can also be employed. In this case, the shaft would be fixed to, for example, the inner circumferential resin portion. Also in this case, as described above, since the precision of the inner diameter of the inner circumferential resin portion can be easily enhanced, the manufacturing costs of the rotary assembly 3 can be reduced. Regardless of whether the shaft is provided in a fixed feature or in a rotating feature, by providing the inner circumferential resin portion, a bearing mechanism (in case the bearing mechanism includes a plurality of bearings, at least a portion of the bearing mechanism) or the shaft can be accurately retained at the inner circumferential resin portion.

The structure of retaining the bearing or the shaft at the inner circumferential resin portion may be separated from the technique of installing the support mark in a more radially inner side than the outer core element 541, and employed in a variety of types of motors. Likewise, the technique of installing an opening 214 for ventilation to the cover 212 may be separated from installing the support mark in a more radially inner side than the outer core element 541, and employed in a variety of types of motors. Of course, the structure of retaining the bearing or the shaft at the inner circumferential resin portion and the technique of installing the opening 214 for ventilation to the cover 212 may be separated from each other, and employed in a variety of types of motors.

The respective elements shown in the preferred embodiments and the modification may be appropriately combined with each other as long as contradiction does not occur.

The motor according to the present disclosure can be used as a driving source for a variety of purposes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
a rotary assembly that rotates on a vertical center axis;
a stationary assembly surrounding the rotary assembly;
a bearing mechanism that rotatably supports the rotary assembly relative to the stationary assembly; and
a shaft rotatably supported relatively with respect to the bearing mechanism; wherein
the rotary assembly includes:
a plurality of magnets arranged in a circumferential direction;
a rotor core including a plurality of magnetic steel plates laminated in an axial direction; and
a resin portion covering the plurality of magnets and the rotor core; wherein
when seen from above, a radial length of each of the plurality of magnets is longer than a circumferential length thereof;
the rotor core includes:
a ring-shaped inner core portion located on a radially inner side of the plurality of magnets;
an outer core portion located on a radially outer side of the inner core portion; and
a plurality of connecting portions connecting the outer core portion and the inner core portion in a radial direction,
the outer core portion includes a plurality of outer core elements connected to the inner core portion through the plurality of connecting portions; and
the resin portion includes:
an upper resin portion covering at least a portion of the top surface of a rotor core and at least a portion of a top surface of each magnet; and a lower resin portion covers at least a portion of a bottom surface of the rotor core and at least a portion of a bottom surface of each magnet;

the resin portion further includes a ring-shaped inner circumferential resin portion that covers the inner circumferential surface of the rotor core;

the upper resin portion and the lower resin portion are continuously connected with the inner circumferential resin portion;

the stationary assembly includes a shaft;

the bearing mechanism includes an upper bearing and a lower bearing;

one of the upper bearing and the lower bearing is retained in the inner circumferential resin portion;

the resin portion has a cylindrical shape with a center on the center axis, and further includes a cylindrical resin portion protruding away from the rotor core; and another one of the upper bearing and the lower bearing is retained in the cylindrical resin portion.

2. The motor according to claim 1, wherein the inner circumferential portion of the rotor core includes a core large-diameter portion and a core small-diameter portion; and the inner circumferential resin portion includes:
  a resin large-diameter portion that covers the core large-diameter portion;
  a resin small-diameter portion that covers the core small-diameter portion; and
  a resin stepped portion between the resin large-diameter portion and the resin small-diameter portion.

3. The motor according to claim 1, wherein the resin portion further includes another cylindrical resin portion that covers an outer circumference of the cylindrical resin portion; and the cylindrical resin portion and the other cylindrical resin portion are connected by a plurality of rib portions in the radial direction.

4. The motor according to claim 3, wherein the resin portion includes an attachment portion around the cylindrical resin portion to attach an impeller cup.

5. The motor according to claim 4, further comprising a circuit board perpendicular to the center axis, wherein an end portion of the one of the upper bearing and the lower bearing is supported by the stationary assembly, and the circuit board axially faces the end portion of the shaft.

6. The motor according to claim 3, further comprising a circuit board perpendicular to the center axis, wherein an end portion of the one of the upper bearing and lower bearing is supported by the stationary assembly, and the circuit board axially faces the end portion of the shaft.

7. The motor according to claim 1, wherein the resin portion includes an attachment portion around the cylindrical resin portion to attach an impeller cup.

8. The motor according to claim 4, further comprising a circuit board perpendicular to the center axis, wherein an end portion of the one of the upper bearing and lower bearing is supported by the stationary assembly, and the circuit board axially faces the end portion of the shaft.

9. The motor according to claim 1, further comprising a circuit board perpendicular to the center axis; wherein an end portion of the one of the upper bearing and lower bearing is supported by the stationary assembly, and the circuit board axially faces the end portion of the shaft.

* * * * *